June 14, 1932.  G. H. E. LYONS  1,863,494
SWITCH
Filed March 7, 1930
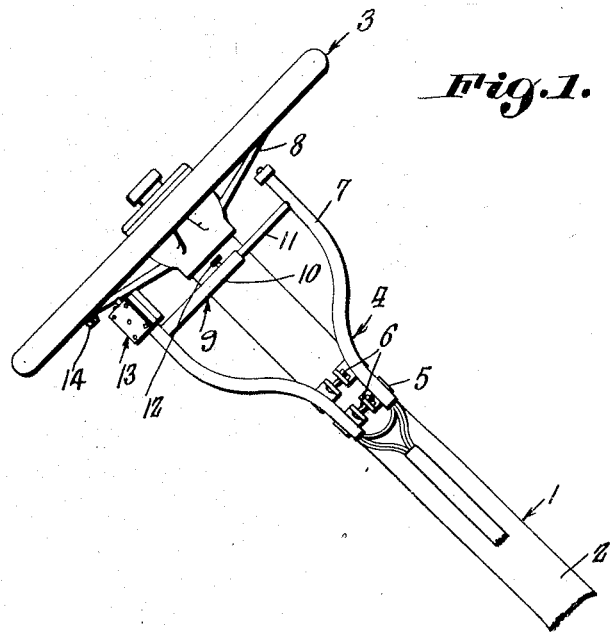
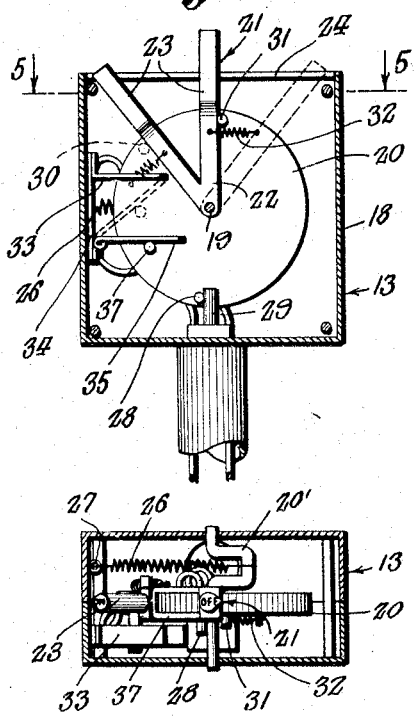
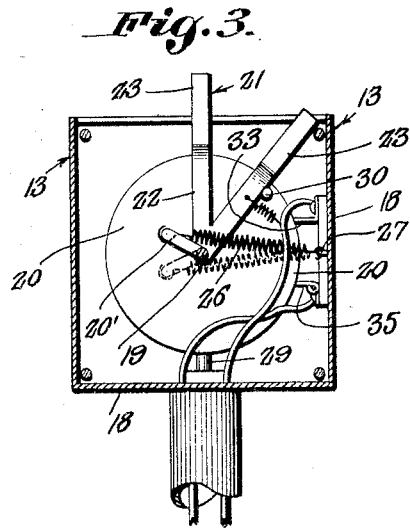
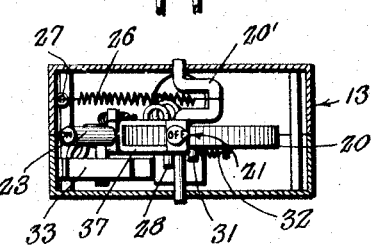
G.H.E.Lyons,
INVENTOR
BY Victor J. Evans
ATTORNEY Patented June 14, 1932

1,863,494

UNITED STATES PATENT OFFICE

GEORGE H. E. LYONS, OF DAYTON, OHIO

SWITCH

Application filed March 7, 1930. Serial No. 434,134.

This invention relates to new and useful improvements in switches for a signalling device and has for its primary object the provision of means, whereby a plurality of signals may be given both automatically and manually by the operation of an automobile and the driver thereof so as to inform drivers of other vehicles the course the respective automobile is to pursue.

A still further object of this invention is to provide a signalling device of the above stated character which will be simple, durable and efficient and which may be manufactured and sold at a comparatively low cost.

With these and other objects in view as will become more apparent as the description proceeds, the invention consists in certain novel features of construction, combination and arrangement of parts as will be hereinafter more fully described and claimed.

For a complete understanding of my invention, reference is to be had to the following description and accompanying drawing in which:—

Figure 1 is a side elevation illustrating a steering wheel and column of an automobile with a part of my invention applied thereto.

Figure 2 is a sectional view illustrating a circuit closing means of my invention.

Figure 3 is a similar view of the same and illustrating the opposite side of the circuit closing means from that shown in Figure 2.

Figure 4 is a sectional view taken on the line 5—5 of Figure 2.

Referring in detail to the drawing, the numeral 1 indicates the usual type of steering mechanism of an automobile and which includes a column 2 carrying the steering wheel 3 to which the circuit closing means of my invention is applied. A support 4 is adjustably mounted on the column 2 as clearly illustrated in Figure 1 and comprises relatively spaced gripping bands 5 that are adjustably secured about the column 2 by bolts 6 and the bands 5 have formed integrally therewith upwardly and outwardly extending arms 7 which terminate adjacent to the spokes 8 of the steering wheel 3 on the underside of the latter. The upper ends of the arms 7 are reinforced or strengthened by adjustable braces 9 which include telescopic members 10 and 11 and held in various adjusted positions by set screws 12. The braces 9 and the adjustable bands 5 permit of the circuit means to be applied to steering columns 2 of different sizes. A pair of the arms 7 carry at their upper ends the circuit closing devices 13 and which are arranged on opposite sides of the steering column 2 in the path of a trip member 14 secured to the steering wheel.

The circuit closing devices 13 are of identical construction with each other, therefore reference to one is thought sufficient for both. The circuit closing device 13 includes a casing 18 mounted on the arm 7 of the support 4 and has located therein an axle 19 on which is journaled a disk 20 constructed from hard rubber or any other insulated material suitable for the purpose. A substantially V-shaped trip lever 21 is bifurcated as at 22 to straddle the disk 20 and has the apex portions apertured to receive the axle 19 and secured to the latter in any desired manner for imparting movement to the axle by movement of the trip lever 21 in either direction. The trip lever 21 being of substantially V-shape provides diverging arm portions 23 that operate through a slot 24 in the top wall of the casing 18 and extend into the path of the trip 14. The axle 19 has a crank 20' formed thereon which is connected to one end of a coil spring 26 which is secured to the casing 18 as at 27 for normally urging a lug 28 into engagement with a stop 29 for positioning the various parts normally as shown in Figure 2 or in circuit opening position. A lug 30 is secured to the disk 20 and is engaged by one of the arm portions 23 of the trip lever 21 for causing the disk 20 to move in one direction when the trip lever is moved into a circuit opening position. A lug 31 is secured to the disk 20 to engage the other arm portion 23 for the purpose of rotating the disk 20 in an opposite direction from that described when the trip lever 21 is moved into a circuit closing position and as shown in dotted lines in Figure 2. Coil springs 32 are secured to the arm portions 23 and to the disk 20 for normally urging said arm portions into engagement with their respective lugs 30 and 31 and which will permit the arm portions to move freely of the disk 20 when operated in a reverse direction. The arm portion 23 which is disposed vertically in Figure 2 is adapted to move into the dotted line position when the device is in circuit closing position for positioning the other arm portion 23 in the position previously occupied by said other arm portion or as shown in Figure 3 for the purpose of being engaged by the trip 14 to return the device into the position shown in Figure 2 or a non-circuit closing position. One of the arm portions 23 has the character "Off" applied thereto while the other arm portion 23 has the character "On" applied thereon so that a person at a glance can determine in what position the circuit closing device occupies. A stationary contact 33 is secured to the casing 18 by an insulating block 34 and has spaced therefrom a movable hinged contact 35 which is hinged to the block 34 as clearly shown in Figure 2 and which is adapted to be moved into engagement with the stationary contact 33 by a lug 37 on the disk 20 when when said disk 20 is rotated in one direction by the trip lever. With the contact 35 in engagement with the contact 33 it closes a circuit and when the disk 20 is rotated in an anti-clockwise direction by reference to Figure 2, the hinged contact 35 will fall by gravity and assume its non-circuit closing position. By reference to Figure 3 the circuit closing device will either maintain a circuit closing position or a circuit breaking position by the position of the crank 20' with respect to the axle 19 and the tension of the spring 26 thereon.

While I have shown and described the preferred embodiment of my invention, it will be understood that minor changes in construction, combination and arrangement of parts can be made without departing from the spirit and scope of the invention as claimed.

Having thus described my invention what I claim is:

A signalling switch comprising a casing having a slot therein, self opening contacts in the casing, a shaft journalled in the casing and having a crank portion, a tension means between the crank portion and the casing for permitting said crank portion to move into several positions and to retain the crank portion in said positions until moved by a force acting on the shaft, a disk journalled on the shaft, a V-shaped lever having a bifurcated portion straddling the disk and secured to the shaft with the ends thereof extending through the slot to be moved from one position to another, means on said disk to be engaged by the lever to move said disk by the lever, means on the disk to close said contacts during the movement of the disk in one direction and to permit said contacts to open by the movement of the disk in an opposite direction.

In testimony whereof I affix my signature.

GEORGE H. E. LYONS.